(12) United States Patent
Dai et al.

(10) Patent No.: US 11,522,221 B2
(45) Date of Patent: Dec. 6, 2022

(54) GELATION REAGENT FOR FORMING GEL ELECTROLYTE AND METHODS RELATING THERETO

(71) Applicant: GM GLOBAL TECHNOLOGY OPERATIONS LLC, Detroit, MI (US)

(72) Inventors: Fang Dai, Troy, MI (US); Shuru Chen, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 378 days.

(21) Appl. No.: 16/725,550

(22) Filed: Dec. 23, 2019

(65) Prior Publication Data
US 2021/0194054 A1 Jun. 24, 2021

(51) Int. Cl.
*H01M 10/0565* (2010.01)
*H01M 10/0525* (2010.01)
*C08F 122/20* (2006.01)

(52) U.S. Cl.
CPC ....... *H01M 10/0565* (2013.01); *C08F 122/20* (2013.01); *H01M 10/0525* (2013.01);
(Continued)

(58) Field of Classification Search
CPC ......... H01M 10/0565; H01M 10/0525; H01M 2300/0082; H01M 2300/0085;
(Continued)

(56) References Cited

U.S. PATENT DOCUMENTS 8,974,946 B2   3/2015 Cai et al.
9,160,036 B2  10/2015 Yang et al.
(Continued)

FOREIGN PATENT DOCUMENTS

CN   113087856 A   7/2021
DE   102020131754 A1   6/2021

OTHER PUBLICATIONS

Xiao, Xingcheng et al., U.S. Appl. No. 16/234,873, filed Dec. 28, 2018 entitled, "Protective Coatings for Lithium Metal Electrodes," 46 pages.

Xiao, Xingcheng et al., U.S. Appl. No. 16/575,143, filed Sep. 18, 2019 entitled, "Additive to Ceramic Ion Conducting Material to Mitigate the Resistive Effect of Surface Carbonates and Hydroxides," 51 pages.

(Continued)

*Primary Examiner* — Gary D Harris
(74) *Attorney, Agent, or Firm* — Harness, Dickey & Pierce, P.L.C.

(57) ABSTRACT

The present technology relates to gel electrolytes for using in lithium-ion electrochemical cells and methods of forming the same. For example, the method may include adding one or more gelation reagents to an electrochemical cell including one or more liquid electrolyte precursors. The one or more gelation reagents include one or more initiators and one or more crosslinking agents. Each of the one or more initiators may be one of a thermal initiator and an actinic/electron beam initiator. Each of the one or more crosslinking agents may be one of a tridentate alkane and a tetradentate alkane having one or more substitutes including a terminal group represented by:

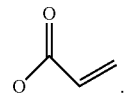

20 Claims, 3 Drawing Sheets

(52) U.S. Cl.
CPC ............ *C08F 2810/20* (2013.01); *H01M 2300/0082* (2013.01); *H01M 2300/0085* (2013.01)

(58) Field of Classification Search
CPC ............ C08F 122/20; C08F 2810/20; C08F 283/06; C08F 2/48; C08F 222/103; C08F 259/08; C08F 265/06; C08F 265/08; Y02E 60/10; C08K 3/32; C08K 5/43
USPC ...................................................... 429/303
See application file for complete search history.

(56) References Cited

U.S. PATENT DOCUMENTS

| | | |
|---|---|---|
| 9,252,411 B2 | 2/2016 | Abd Elhamid et al. |
| 9,373,829 B2 | 6/2016 | Xiao et al. |
| 9,647,254 B2 | 5/2017 | Dadheech et al. |
| 9,742,028 B2 | 8/2017 | Zhou et al. |
| 9,923,189 B2 | 3/2018 | Xiao |
| 9,929,435 B2 | 3/2018 | Cai et al. |
| 9,979,008 B2 | 5/2018 | Dai et al. |
| 10,084,204 B2 | 9/2018 | Dai et al. |
| 10,128,481 B2 | 11/2018 | Xiao et al. |
| 10,199,643 B2 | 2/2019 | Zhou et al. |
| 10,224,571 B2 | 3/2019 | Yang et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,396,360 B2 | 8/2019 | Xiao et al. |
| 10,431,849 B2 | 10/2019 | Yersak et al. |
| 10,434,894 B2 | 10/2019 | Li et al. |
| 10,446,884 B2 | 10/2019 | Yang et al. |
| 11,031,586 B2 | 6/2021 | Chen et al. |
| 2015/0056387 A1 | 2/2015 | Dadheech et al. |
| 2015/0056493 A1 | 2/2015 | Dadheech et al. |
| 2015/0349307 A1 | 12/2015 | Dadheech et al. |
| 2016/0172706 A1 | 6/2016 | Xiao et al. |
| 2016/0172710 A1 | 6/2016 | Liu et al. |
| 2017/0162859 A1 | 6/2017 | Yang et al. |
| 2017/0214079 A1 | 7/2017 | Dai et al. |
| 2017/0271678 A1 | 9/2017 | Yang et al. |
| 2018/0294517 A1 | 10/2018 | Yersak et al. |
| 2018/0309166 A1 | 10/2018 | Yersak et al. |
| 2018/0375148 A1 | 12/2018 | Yersak et al. |
| 2019/0044134 A1 | 2/2019 | Liu et al. |
| 2019/0058210 A1 | 2/2019 | Dai et al. |
| 2019/0058211 A1 | 2/2019 | Yang et al. |
| 2019/0058215 A1 | 2/2019 | Dai et al. |
| 2019/0058219 A1 | 2/2019 | Yang et al. |
| 2019/0067675 A1 | 2/2019 | Xiao |
| 2019/0067744 A1 | 2/2019 | Xiao et al. |
| 2019/0089006 A1 | 3/2019 | Yang et al. |
| 2019/0165415 A1 | 5/2019 | Dai et al. |
| 2019/0165416 A1 | 5/2019 | Dai et al. |
| 2019/0207201 A1 | 7/2019 | Dai et al. |
| 2019/0207205 A1 | 7/2019 | Adair et al. |
| 2019/0207208 A1 | 7/2019 | Dai et al. |
| 2019/0207211 A1 | 7/2019 | Dai et al. |
| 2019/0207245 A1 | 7/2019 | Adair et al. |
| 2019/0207261 A1 | 7/2019 | Yang et al. |
| 2019/0225092 A1 | 7/2019 | Li et al. |
| 2019/0226859 A1 | 7/2019 | Li et al. |
| 2019/0232251 A1 | 8/2019 | Dailly et al. |
| 2019/0237803 A1* | 8/2019 | Gerasopoulos ... H01M 10/0565 |
| 2019/0312255 A1 | 10/2019 | Dai et al. |
| 2019/0319242 A1 | 10/2019 | Dadheech et al. |
| 2019/0329363 A1 | 10/2019 | Zhang et al. |
| 2019/0372155 A1 | 12/2019 | Yersak et al. |
| 2019/0372164 A1 | 12/2019 | Salvador et al. |
| 2020/0203710 A1 | 6/2020 | Li et al. |
| 2020/0212446 A1 | 7/2020 | Xiao et al. |
| 2020/0321603 A1 | 10/2020 | Xiao |
| 2020/0321617 A1 | 10/2020 | Xiao |
| 2020/0395630 A1 | 12/2020 | Yersak et al. |
| 2021/0083249 A1 | 3/2021 | Xiao et al. |
| 2021/0111407 A1 | 4/2021 | Li et al. |

OTHER PUBLICATIONS

Li, Binsong et al., U.S. Appl. No. 16/599,714, filed Oct. 11, 2019 entitled, "In-Situ Polymerization to Protect Lithium Metal Electrodes," 46 pages.

* cited by examiner

GELATION REAGENT FOR FORMING GEL ELECTROLYTE AND METHODS RELATING THERETO

INTRODUCTION

This section provides background information related to the present disclosure which is not necessarily prior art.

The present technology relates to gel electrolytes for using in lithium-ion electrochemical cells and methods of forming the same, for example the method includes adding one or more gelation reagents to an electrochemical cell including one or more liquid electrolyte precursors and the one or more gelation reagents include one or more initiators and one or more crosslinking agents.

Advanced energy storage devices and systems are in demand to satisfy energy and/or power requirements for a variety of products, including automotive products such as start-stop systems (e.g., 12V start-stop systems), battery-assisted systems, Hybrid Electric Vehicles ("HEVs"), and Electric Vehicles ("EVs"). Typical lithium-ion batteries include at least two electrodes and an electrolyte and/or separator. One of the two electrodes serves as a positive electrode or cathode and the other electrode serves as a negative electrode or anode. A separator and/or electrolyte may be disposed between the negative and positive electrodes. The electrolyte is suitable for conducting lithium ions between the electrodes and, like the two electrodes, may be in various instances solid and/or liquid form and/or a hybrid thereof. Liquid electrolytes containing highly flammable organic solvents, however, often pose significant safety concerns and are susceptible to leakage. Likewise, though solid electrolytes often have improved safety when compared to liquid electrolytes, as well as good mechanical properties, electrochemical cells including solid electrolytes are often plagued by void spaces. Gel polymer electrolytes ("GPEs") are of great interest as combining characteristics of both solid and liquid electrolytes, for example providing high ionic diffusivity similar to liquid electrolytes, as well as dimensional stability similar to solid-state electrolytes. However, common gelation methods are generally not compatible with common fabrication processes for lithium-ion batteries and often require additional fabrication steps. Accordingly, it would be desirable to develop improved electrolyte materials, and methods of making the same, for an electrochemical cell that can address these challenges.

SUMMARY

This section provides a general summary of the disclosure, and is not a comprehensive disclosure of its full scope or all of its features.

In various aspects, the present disclosure provides a method of preparing a gel polymer electrolyte for use in an electrochemical cell that cycles lithium ions. The method may include adding a gelation reagent to a liquid electrolyte to form an electrolyte mixture that defines the gel polymer electrolyte. The gelation reagent may include one or more initiators and one or more crosslinking agents. Each of the one or more initiators may be one of a thermal initiator and an actinic/electron beam initiator. Each of the one or more crosslinking agents may be one of a tridentate alkane and a tetradentate alkane having one or more substitutes including a terminal group represented by:

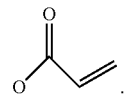

In one aspect, the one or more crosslinking agents may be selected from the group consisting of: trimethylolpropane triacrylate (TMPTA), pentaerythritol triacrylate, ethoxylated trimethylolpropane triacrylate, alkyloyl-modified dipentaerythritol triacrylate, ethoxylated glycerin tri acrylate, pentaerythritol tetraacrylate, di(trimethylolpropane) tetraacrylate, ethoxylated pentaerythritol tetraacrylate, and combinations thereof.

In one aspect, the gel polymer electrolyte may include a polymeric backbone. The polymeric backbone may be defined by the one or more crosslinking agents.

In one aspect, the one or more initiators may include a thermal initiator selected from the group consisting of: azobisisobutyronitrile (AIBN), 1,1'-azobis(cyclohexanecarbonitrile) (ABCN), benzoyl peroxide (BPO), di-tert-butyl peroxide, and combinations thereof.

In one aspect, after adding the gelation reagent to the liquid electrolyte, the method may further includes heating the electrolyte mixture to a temperature greater than or equal to about 45° C. to less than or equal to about 120° C. for a period greater than or equal to about 5 minutes to less than or equal to about 180 minutes to form the gel polymer electrolyte.

In one aspect, the one or more initiators may include an actinic/electron beam initiator selected from the group consisting of: benzophenone, diaryliodonium hexafluoroantimonate, acetophenone, anisoin, benzil, benzoin, 2-benzyl-2-(dimethylamino)-4'-morpholinobutyrophenone, camphorquinone, 4,4'-dihydroxybenzophenone, 4'-ethoxyacetophenone, methylbenzoylformate, 2-methyl-4'-(methylthio)-2-morpholinopropiophenone, thioxanthen-9-one, and combinations thereof.

In one aspect, after adding the gelation reagent to the liquid electrolyte, the method may further include applying one of an electron beam and actinic radiation to the electrolyte mixture to form the gel polymer electrolyte.

In one aspect, the gelation reagent may include greater than or equal to about 0.1 wt. % to less than or equal to about 10 wt. % of the one or more initiators and a balance of the one or more crosslinking agent.

In one aspect, the gel polymer electrolyte may include greater than or equal to about 1 wt. % to less than or equal to about 99 wt. % of the gelation reagent.

In one aspect, the liquid electrolyte may include one or more lithium salts selected from the group consisting of: lithium hexafluorophosphate (LiPF$_6$); lithium perchlorate (LiClO$_4$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium difluorooxalatoborate (LiBF$_2$(C$_2$O$_4$)) (LiODFB), lithium tetraphenylborate (LiB(C$_6$H$_5$)$_4$), lithium bis-(oxalate)borate (LiB(C$_2$O$_4$)$_2$) (LiBOB), lithium tetrafluorooxalatophosphate (LiPF$_4$(C$_2$O$_4$)) (LiFOP), lithium nitrate (LiNO$_3$), lithium hexafluoroarsenate (LiAsF$_6$), lithium trifluoromethanesulfonate (LiCF$_3$SO$_3$), lithium bis(trifluoromethanesulfonimide) (LiTFSI) (LiN(CF$_3$SO$_2$)$_2$), lithium fluorosulfonylimide (LiN(FSO$_2$)$_2$) (LiFSI), lithium fluoroalkylphosphate (LiFAP) (Li$_3$O$_4$P), and combinations thereof; and one or more solvents selected from the group consisting of: ethylene carbonate (EC), propylene carbonate (PC), butylene carbonate (BC), fluoroethylene carbonate (FEC), dimethyl carbonate (DMC), diethyl carbonate (DEC), ethyl methyl carbonate (EMC), methyl formate, methyl acetate, methyl propionate, γ-butyrolactone, γ-valerolactone, 1,2-dimethoxyethane (DME), 1-2-diethoxyethane, ethoxymethoxyethane, tetrahydrofuran, 2-methyltetrahydrofuran, 1,3-dioxolane (DOL), sulfolane, and combinations thereof.

In one aspect, the method may further include injecting the gel polymer electrolyte into an electrochemical cell.

In various other aspects, the present disclosure provides a method of preparing a gel polymer electrolyte for an electrochemical cell that cycles lithium ions. The method may include contacting a gelation reagent and a liquid electrolyte to form an electrolyte precursor. The gelation reagent may include one or more initiators and one or more crosslinking agents. Each of the one or more initiators may be one of a thermal initiator and an actinic/electron beam initiator. Each of the one or more crosslinking agents may be one of a tridentate alkane and a tetradentate alkane having one or more substitutes including a terminal group represented by:

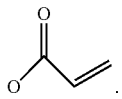

The method may further include introducing the electrolyte precursor into an electrochemical cell and curing the electrolyte precursor to form the gel polymer electrolyte.

In one aspect, the gel polymer electrolyte may include a polymeric backbone. The polymeric backbone may be defined by the one or more crosslinking. The one or more crosslinking agents may be selected from the group consisting of: trimethylolpropane triacrylate (TMPTA), pentaerythritol triacrylate, ethoxylated trimethylolpropane triacrylate, alkyloyl-modified dipentaerythritol triacrylate, ethoxylated glycerin triacrylate, pentaerythritol tetraacrylate, di(trimethylolpropane) tetraacrylate, ethoxylated pentaerythritol tetraacrylate, and combinations thereof.

In one aspect, the one or more initiators may include a thermal initiator selected from the group consisting of: azobisisobutyronitrile (AIBN), 1,1'-azobis(cyclohexanecarbonitrile) (ABCN), benzoyl peroxide (BPO), di-tert-butyl peroxide, and combinations thereof. The electrolyte precursor may be cured by heating the electrolyte precursor to a temperature greater than or equal to about 45° C. to less than or equal to about 120° C. for a period greater than or equal to about 5 minutes to less than or equal to about 180 minutes.

In one aspect, the one or more initiators may include an actinic/electron beam initiator selected from the group consisting of: benzophenone, diaryliodonium hexafluoroantimonate, acetophenone, anisoin, benzil, benzoin, 2-benzyl-2-(dimethylamino)-4'-morpholinobutyrophenone, camphorquinone, 4,4'-dihydroxybenzophenone, 4'-ethoxyacetophenone, methylbenzoylformate, 2-methyl-4'-(methylthio)-2-morpholinopropiophenone, thioxanthen-9-one, and combinations thereof.

In one aspect, the gelation reagent may include greater than or equal to about 0.1 wt. % to less than or equal to about 10 wt. % of the one or more initiators and a balance of the one or more crosslinking agent.

In various other aspects, the present disclosure provides a gelation reagent for forming a gel polymer electrolyte. The gelation reagent may include one or more initiators and one or more crosslinking agents. Each of the one or more initiators may be one of a thermal initiator and an actinic/electron beam initiator. Each of the one or more crosslinking agents may be one of a tridentate alkane and a tetradentate alkane having one or more substitutes including a terminal group represented by:

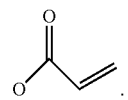

The gel polymer electrolyte may include a polymeric backbone. The one or more crosslinking agents may define the polymeric backbone.

In one aspect, the one or more crosslinking agents may be selected from the group consisting of: trimethylolpropane triacrylate (TMPTA), pentaerythritol triacrylate, ethoxylated trimethylolpropane triacrylate, alkyloyl-modified dipentaerythritol triacrylate, ethoxylated glycerin triacrylate, pentaerythritol tetraacrylate, di(trimethylolpropane) tetraacrylate, ethoxylated pentaerythritol tetraacrylate, and combinations thereof.

In one aspect, the one or more initiators may include a thermal initiator selected from the group consisting of: azobisisobutyronitrile (AIBN), 1,1'-azobis(cyclohexanecarbonitrile) (ABCN), benzoyl peroxide (BPO), di-tert-butyl peroxide, and combinations thereof.

In one aspect, the one or more initiators may include an actinic/electron beam initiator selected from the group consisting of: benzophenone, diaryliodonium hexafluoroantimonate, acetophenone, anisoin, benzil, benzoin, 2-benzyl-2-(dimethylamino)-4'-morpholinobutyrophenone, camphorquinone, 4,4'-dihydroxybenzophenone, 4'-ethoxyacetophenone, methylbenzoylformate, 2-methyl-4'-(methylthio)-2-morpholinopropiophenone, thioxanthen-9-one, and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
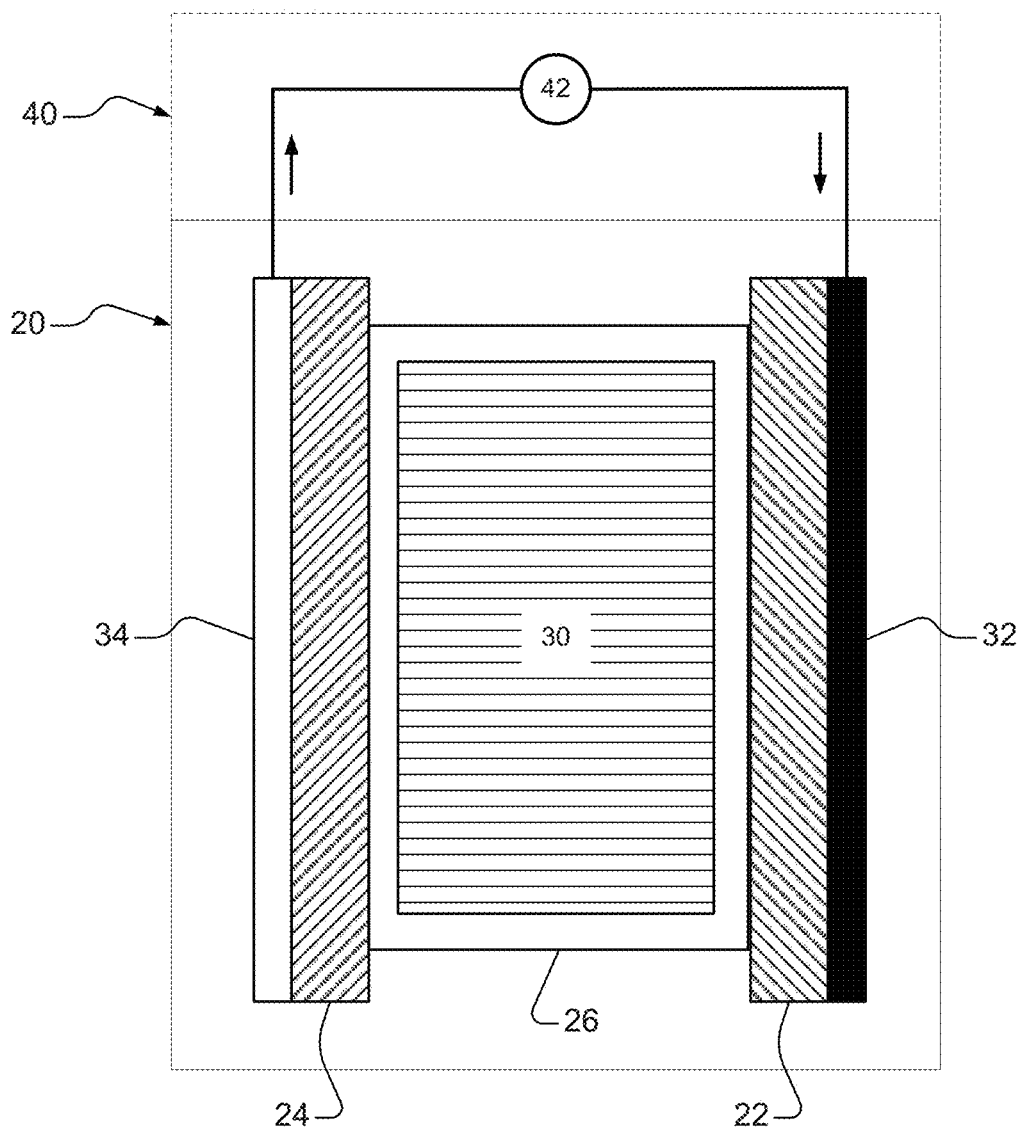
FIG. 1 is a schematic of an example electrochemical battery that cycles lithium ions.

Example embodiments are provided so that this disclosure will be thorough, and will fully convey the scope to those who are skilled in the art. Numerous specific details are set forth, such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers, and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

A typical lithium-ion battery includes a first electrode (such as a positive electrode or cathode) opposing a second electrode (such as a negative electrode or anode) and a separator and/or electrolyte disposed therebetween. Often, in a lithium-ion battery pack, batteries or cells may be electrically connected in a stack or winding configuration to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions and, in various aspects, may be in liquid, gel, or solid form. For example, an exemplary and schematic illustration of an electrochemical cell (also referred to as the battery) 20 is shown in FIG. 1. Though the illustrated example includes a single cathode 24 and a single anode 22, the skilled artisan will recognize that the current teachings apply to various other configurations, including those having one or more cathodes and one or more anodes, as well as various current collectors with electroactive layers disposed on or adjacent to one or more surfaces thereof.

The battery 20 includes a negative electrode (anode) 22, a positive electrode (cathode) 24, and a separator 26 disposed between the electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24.

A negative electrode current collector 32 may be positioned at or near the negative electrode 22, and a positive electrode current collector 34 may be positioned at or near the positive electrode 24. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34). The positive electrode current collector 34 may be a metal foil, metal grid or screen, or expanded metal, comprising aluminum or any other appropriate electrically conductive material known to those of skill in the art. The negative electrode current collector 32 may be a metal foil, metal grid or screen, or expanded metal, comprising copper or any other appropriate electrically conductive material known to those of skill in the art.

The battery 20 may generate an electric current during discharge by way of reversible electrochemical reactions that occur when the external circuit 40 is closed (to connect the negative electrode 22 and the positive electrode 24) and the negative electrode 22 contains a relatively greater quantity of lithium than the positive electrode 24. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions, which are also produced at the negative electrode 22, are concurrently transferred through the electrolyte 30 contained in the separator 26 towards the positive electrode 24. The electrons flow through the external circuit 40 and the lithium ions migrate across the separator 26 containing the electrolyte 30 to form intercalated lithium at the positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium-ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back towards the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30, for example inside their pores, capable of conducting lithium ions between the negative electrode 22 and the positive electrode 24. For example, the electrolyte 30 may be a gel polymer electrolyte ("GPE") having a viscosity greater than or equal to about 10 mPs·S to less than or equal to about 10,000 mPs·S, and in certain aspects, optionally greater than or equal to about 50 mPs·S to less than or equal to about 1000 mPs·S and including non-aqueous liquid electrolyte solution immobilized within a polymeric matrix. For example, the electrolyte may include greater than or equal to about 1 wt. % to less than or equal to about 99 wt. %, and in certain aspects, optionally greater than or equal to about 50 wt. % to less than or equal to about 95 wt. % of the non-aqueous liquid electrolyte solution and greater than or equal to about 1 wt. % to less than or equal to about 99 wt. %, and in certain aspects, optionally greater than or equal to about 5 wt. % to less than or equal to about 50 wt. % of the polymeric matrix.

In various aspect the polymeric matrix may be defined by a polymer backbone including one or more polymers selected from the group consisting of: poly(ethylene oxide) (PEO), poly(acrylonitrile) (PAN), poly(methyl methacrylate) (PMMA), poly(vinylidene fluoride) (PVDF), and combinations thereof. The non-aqueous liquid electrolyte solution that includes a lithium salt dissolved in an organic solvent or a mixture of organic solvents. For example, numerous conventional non-aqueous liquid electrolyte solutions may be employed.

Appropriate lithium salts generally have inert anions. A non-limiting list of lithium salts that may be dissolved in an organic solvent or a mixture of organic solvents to form the non-aqueous liquid electrolyte solution include lithium hexafluorophosphate ($LiPF_6$); lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium difluorooxalatoborate ($LiBF_2(C_2O_4)$) (LiODFB), lithium tetraphenylborate ($LiB(C_6H_5)_4$), lithium bis-(oxalate)borate ($LiB(C_2O_4)_2$) (LiBOB), lithium tetrafluorooxalatophosphate ($LiPF_4(C_2O_4)$) (LiFOP), lithium nitrate ($LiNO_3$), lithium hexafluoroarsenate ($LiAsF_6$), lithium trifluoromethanesulfonate ($LiCF_3SO_3$), lithium bis(trifluoromethanesulfonimide) (LiTFSI) ($LiN(CF_3SO_2)_2$), lithium fluorosulfonylimide ($LiN(FSO_2)_2$) (LiFSI), lithium fluoroalkylphosphate (LiFAP) ($Li_3O_4P$), and combinations thereof.

These and other similar lithium salts may be dissolved in a variety of organic solvents, including, but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethyl methyl carbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane (DME), 1-2-diethoxyethane, ethoxymethoxyethane), cyclic ethers (e.g., tetrahydrofuran, 2-methyltetrahydrofuran, 1,3-dioxolane (DOL)), sulfur compounds (e.g., sulfolane), and combinations thereof. In various aspects, the liquid electrolyte may include greater than or equal to 0.1 M to less than or equal to about 5 M concentration of the one or more lithium salts.

In various aspects, the electrolyte 30 comprising a gel polymer electrolyte may serve as both a conductor of lithium ions and a separator, for example separator 26, such that a distinct separator component is not required. In various other aspects, however, the separator 26 may be a microporous polymeric separator including, for example a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes include CELGARD® 2500 (a monolayer polypropylene separator) and CELGARD® 2320 (a trilayer polypropylene/polyethylene/polypropylene separator) available from Celgard LLC. Various other conventionally available polymers and commercial products for forming the separator 26 are contemplated, as well as the many manufacturing methods that may be employed to produce such a microporous polymer separator 26.

When the separator 26 is a microporous polymeric separator, it may be a single layer or a multi-layer laminate, which may be fabricated from either a dry or wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26.

The separator 26 may also comprise other polymers in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (AB S), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), titania ($TiO_2$), and combinations thereof. The heat-resistant material may be selected from the group consisting of: Nomex, Aramid, and combinations thereof.

In various aspects, the positive electrode 24 comprises a lithium-based positive electroactive material that is capable of undergoing lithium intercalation and deintercalation, alloying and dealloying, or plating and stripping, while functioning as a positive terminal of the capacitor battery 20. In various aspects, the positive electrode 24 may be defined by a plurality of electroactive material particles (not shown). Such positive electroactive material particles may be disposed in one or more layers so as to define the three-dimensional structure of the positive electrode 24. In certain variations, as noted above, the positive electrode 24 may further include the electrolyte 30, for example a plurality of electrolyte particles (not shown).

In various aspects, the positive electrode 24 may be one of a layered-oxide cathode, a spinel cathode, and a polyanion cathode. For example, layered-oxide cathodes (e.g., rock salt layered oxides) comprise one or more lithium-based positive electroactive materials selected from $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where M is one of Mn, Ni, Co, and Al and $0 \leq x \leq 1$) (for example $LiCoO_2$ (LCO), $LiNiO_2$, $LiMnO_2$, $LiNi_{0.5}Mn_{0.5}O_2$, NMC111, NMC523, NMC622, NMC 721, NMC811, NCA). Spinel cathodes comprise one or more lithium-based positive electroactive materials selected from $LiMn_2O_4$ and $LiNi_{0.5}Mn_{1.5}O_4$. Olivine type cathodes comprise one or more lithium-based positive electroactive material such as $LiV_2(PO_4)_3$, $LiFePO_4$, $LiCoPO_4$, and $LiMnPO_4$. Tavorite type cathodes comprise, for example, $LiVPO_4F$. Borate type cathodes comprise, for example, one or more of $LiFeBO_3$, $LiCoBO_3$, and $LiMnBO_3$. Silicate type cathodes comprise, for example, $Li_2FeSiO_4$, $Li_2MnSiO_4$, and $LiMnSiO_4F$. In still further variations, the positive electrode 24 may comprise one or more other positive electroactive materials, such as one or more of dilithium (2,5-dilithiooxy) terephthalate and polyimide. In various aspects, the positive electroactive material may be optionally coated (for example by $LiNbO_3$ and/or $Al_2O_3$) and/or may be doped (for example by one or more of magnesium (Mg), aluminum (Al), and manganese (Mn)).

The positive electroactive material of the positive electrode 24 may be optionally intermingled with one or more electrically conductive materials that provide an electron conductive path and/or at least one polymeric binder material that improves the structural integrity of the positive electrode 24. For example, the positive electroactive material in the positive electrode 24 may be optionally intermingled with binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, ethylene propylene diene monomer (EPDM), and combinations thereof. Electrically conductive materials may include carbon-based materials, powder nickel or other metal particles, or a conductive polymer. Carbon-based materials may include, for example, particles of carbon black, graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like.

For example, the positive electrode 24 may include greater than or equal to about 50 wt. % to less than or equal to about 99 wt. %, and in certain aspects, optionally greater than or equal to about 50 wt. % to less than or equal to about 95 wt. %, of the positive electroactive material; greater than or equal to about 0 wt. % to less than or equal to about 30 wt. %, and in certain aspects, optionally greater than or equal to about 2 wt. % to less than or equal to about 5 wt. %, of one or more electrically conductive materials; and greater than or equal to about 0 wt. % to less than or equal to about 20 wt. %, and in certain aspects, optionally greater than or equal to about 2 wt. % to less than or equal to about 5 wt. %, of one or more binders.

In various aspects, the negative electrode 22 comprises a lithium host material that is capable of functioning as a negative terminal of a lithium-ion battery. For example, the negative electrode 22 may comprise a lithium host material (e.g., negative electroactive material) that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. In certain variations, as noted above, the negative electrode 22 may further include the electrolyte 30, for example a plurality of electrolyte particles (not shown).

The negative electrode 22 may include a negative electroactive material that is lithium based comprising, for example, a lithium metal and/or lithium alloy. In other variations, the negative electrode 22 may include a negative electroactive material that is silicon based comprising silicon, for example, a silicon alloy, silicon oxide, or combinations thereof that may be further mixed, in certain instances, with graphite. In still other variations, the negative electrode 22 may be a negative electroactive material that is a carbonaceous anode comprising, for example, one or more negative electroactive materials such as graphite, graphene, and/or carbon nanotubes (CNTs). In still further variations, the negative electrode 22 may comprise one or more lithium-accepting negative electroactive materials, such as lithium titanium oxide ($Li_4Ti_5O_{12}$), one or more transition metals (such as tin (Sn)), one or more metal oxides (such as vanadium oxide ($V_2O_5$), tin oxide (SnO), titanium dioxide ($TiO_2$)), titanium niobium oxide ($Ti_xNb_yO_z$, where $0 \leq x \leq 2$, $0 \leq y \leq 24$, and $0 \leq z \leq 64$), and one or more metal sulfides (such as ferrous or iron sulfide (FeS)). In various aspects, as further detailed below, the negative electroactive material may be pre-lithiated.

In various aspects, the negative electroactive material in the negative electrode 22 may be optionally intermingled with one or more electrically conductive materials that provide an electron conductive path and/or at least one polymeric binder material that improves the structural integrity of the negative electrode 22. For example, the negative electroactive material in the negative electrode 22 may be optionally intermingled with binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, ethylene propylene diene monomer (EPDM), and combinations thereof. Electrically conductive materials may include carbon-based materials, powder nickel or other metal particles, or a conductive polymer. Carbon-based materials may include, for example, particles of carbon black, graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like.

For example, the negative electrode 22 may include greater than or equal to about 50 wt. % to less than or equal to about 99 wt. %, and in certain aspects, optionally greater than or equal to about 50 wt. % to less than or equal to about 95 wt. %, of the negative electroactive material; greater than or equal to about 0 wt. % to less than or equal to about 30 wt. %, and in certain aspects, optionally greater than or equal to about 5 wt. % to less than or equal to about 20 wt. %, of one or more electrically conductive materials; and greater than or equal to about 0 wt. % to less than or equal to about 20 wt. %, and in certain aspects, optionally greater than or equal to about 5 wt. % to less than or equal to about 15 wt. %, of one or more binders.

In various aspects, the present disclosure provides a method for making a gel polymer electrolyte, for example electrolyte 30 as illustrated in FIG. 1. The method includes adding a gelation reagent to a non-aqueous liquid electrolyte solution comprising a lithium salt dissolved in an organic solvent or a mixture of organic solvents. For example, the non-aqueous liquid electrolyte solution may include one or more lithium salts selected from the group consisting of: lithium hexafluorophosphate (LiPF$_6$), lithium perchlorate (LiClO$_4$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium difluorooxalatoborate (LiBF$_2$(C$_2$O$_4$)) (LiODFB), lithium tetraphenylborate (LiB(C$_6$H$_5$)$_4$), lithium bis-(oxalate)borate (LiB(C$_2$O$_4$)$_2$) (LiBOB), lithium tetrafluorooxalatophosphate (LiPF$_4$(C$_2$O$_4$)) (LiFOP), lithium nitrate (LiNO$_3$), lithium hexafluoroarsenate (LiAsF$_6$), lithium trifluoromethanesulfonate (LiCF$_3$SO$_3$), lithium bis(trifluoromethanesulfonimide) (LiTFSI) (LiN(CF$_3$SO$_2$)$_2$), lithium fluorosulfonylimide (LiN(FSO$_2$)$_2$) (LiFSI), lithium fluoroalkylphosphate (LiFAP) (Li$_3$O$_4$P), and combinations thereof. The non-aqueous liquid electrolyte solution may include one or more solvents selected from the group consisting of: ethylene carbonate (EC), propylene carbonate (PC), butylene carbonate (BC), fluoroethylene carbonate (FEC), dimethyl carbonate (DMC), diethyl carbonate (DEC), ethyl methyl carbonate (EMC), methyl formate, methyl acetate, methyl propionate, γ-butyrolactone, γ-valerolactone, 1,2-dimethoxyethane (DME), 1-2-diethoxyethane, ethoxymethoxyethane, tetrahydrofuran, 2-methyltetrahydrofuran, 1,3-dioxolane (DOL), sulfolane, and combinations thereof.

The gelation reagent may include one or more initiators and one or more crosslinking agents. For example, each of the crosslinking agents may be one of a tridentate alkane and a tetradentate alkane having one or more substitutes including a terminal group represented by:

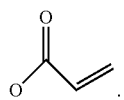

For example, in various aspects, the one or more crosslinking agents are selected from the group consisting of: trimethylolpropane triacrylate (TMPTA), pentaerythritol triacrylate, ethoxylated trimethylolpropane triacrylate, alkyloyl-modified dipentaerythritol triacrylate, ethoxylated glycerin triacrylate, pentaerythritol tetraacrylate, di(trimethylolpropane) tetraacrylate, ethoxylated pentaerythritol tetraacrylate, and combinations thereof.

Each of the one or more initiators are one of a thermal initiator and an actinic radiation/electron beam initiator. For example, in certain variations, the one or more initiators may be a thermal initiator selected from the group consisting of: azobisisobutyronitrile (AIBN), 1,1'-azobis(cyclohexanecarbonitrile) (ABCN), benzoyl peroxide (BPO), di-tert-butyl peroxide, and combinations thereof. In such instances, the method may further include heating the electrolyte mixture to a temperature greater than or equal to about 45° C. to less than or equal to about 120° C., and in certain aspects, optionally greater than or equal to about 50° C. to less than or equal to about 70° C., for a period greater than or equal to about 5 minutes to less than or equal to about 180 minutes, and in certain aspects, optionally greater than or equal to about 30 minutes to less than or equal to about 120 minutes to form the gel polymer electrolyte. For example, in various instances, the electrolyte mixture, including the one or more crosslinkers and the thermal initiator, may be introduced or injected into an electrochemical cell, for example similar to battery 20 illustrated in FIG. 1, and by the application of heat may induce in-situ polymerization or cross-linking of the one or more crosslinking agents.

In other variations, the one or more initiators may be an actinic/electron beam initiator selected from the group consisting of: benzophenone, diaryliodonium hexafluoroantimonate, acetophenone, anisoin, benzil, benzoin, 2-benzyl-2-(dimethylamino)-4'-morpholinobutyrophenone, camphorquinone, 4,4'-dihydroxybenzophenone, 4'-ethoxyacetophenone, methybenzoylformate, 2-methyl-4'-(methylthio)-2-morpholinopropiophenone, thioxanthen-9-one, and combinations thereof. In such instances, the method may further include applying one of an electron beam and actinic radiation, for example ultraviolet light (e.g., 200 nm to 400 nm), to form the gel polymer electrolyte. For example, in various instances, the electrolyte mixture including the one or more crosslinkers and the actinic/electron beam initiator, may be introduced or injected into an electrochemical cell, for example similar to battery 20 illustrated in FIG. 1, and the application of an electron beam and/or actinic radiation, for example ultraviolet light (e.g., 200 nm to 400 nm), may induce in-situ polymerization or cross-linking of the one or more crosslinking agents.

Heating and/or applying one of the electron beam and the actinic radiation to the electrolyte mixture may induce polymerization or cross-linking of the crosslinking agents so as to form a polymeric backbone or matrix that that defines the gel polymer electrolyte. The polymeric backbone provides support for the liquid electrolyte.

EXAMPLES

Embodiments and features of the present technology are further illustrated through the following non-limiting examples:

Example I

An example electrochemical cell is prepared in accordance with various aspects of the present disclosure. For example, a gelation reagent include ethoxylated trimethylolpropane triacrylate and 2-benzyl-2-(dimethylamino)-4'-morpholinobutyrophenone may be added to an liquid electrolyte including salt lithium hexafluorophosphate (LiPF$_6$) and co-solvents fluoroethylene carbonate (FEC) and ethyl methyl carbonate (EMC). For example, the electrolyte mixture may include about 5 wt. % of the gelation reagent. The electrolyte mixture may be added to an electrochemical cell having a positive electrode that comprises NMC622 and a negative electrode comprising lithium metal.

Figure 2:
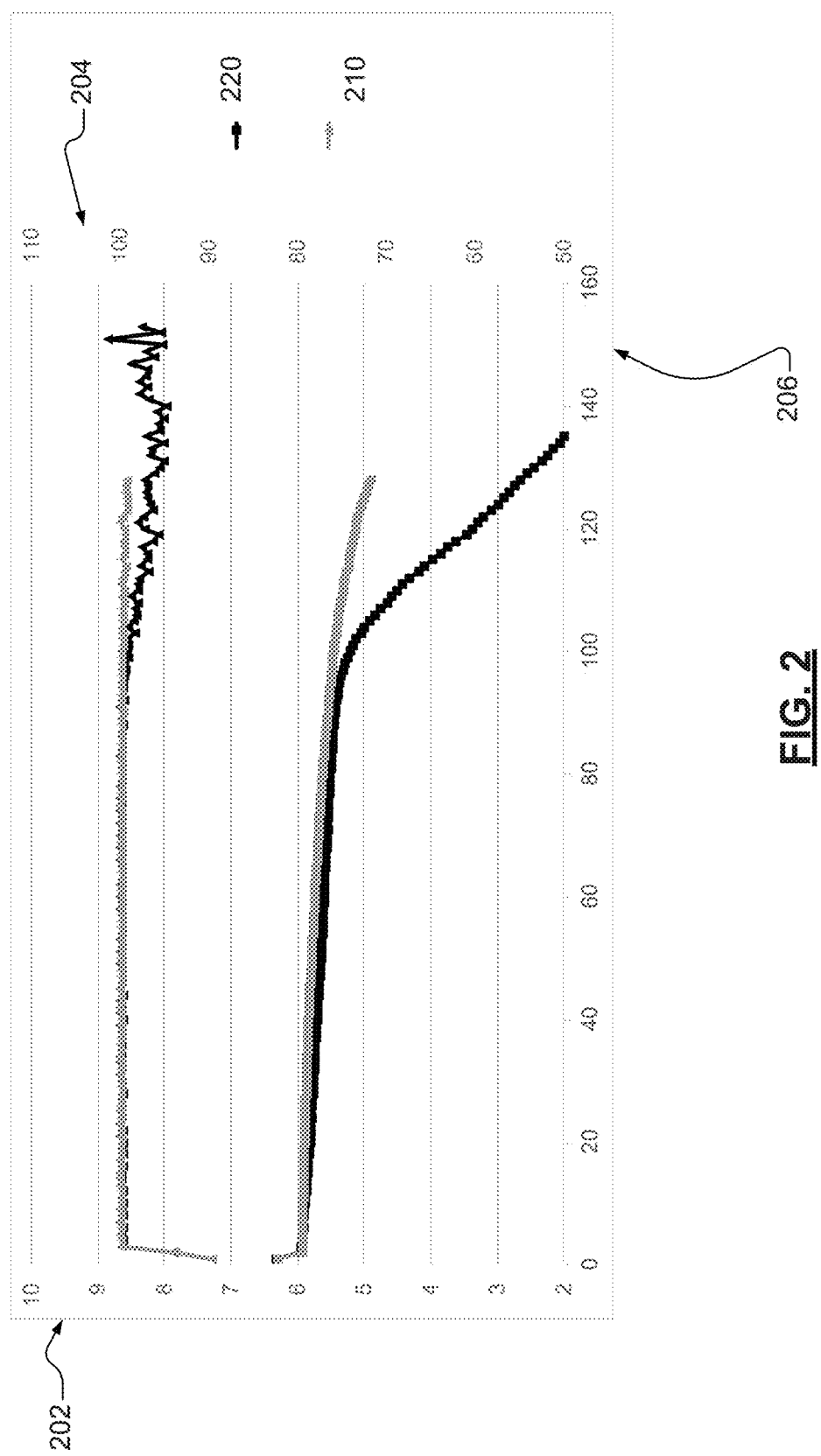
FIG. 2 is a graphical illustration of the capacity retention and columbic efficiency of comparative electrochemical cells.

The example electrochemical cell is prepared in accordance with various aspects of the present disclosure and may be compared to a comparable baseline electrochemical cell where the gelation reagent is absent. For example, as illustrated in FIG. 2, the example electrochemical cell 210 has improved capacity retention compared to the baseline electrochemical cell 220. For example, the example electrochemical cell 210 may have an about 30% improvement in cycle lift. The y$_1$-axis 202 in FIG. 2 represents total capacity (mAh) and y$_2$-axis 204 represents columbic efficiency (%), while cycle number is shown on the x-axis 206.

Example II

Another example electrochemical cell is prepared in accordance with various aspects of the present disclosure.

For example, a gelation reagent include ethoxylated trimethylolpropane triacrylate and benzophenone may be added to a liquid electrolyte including salt lithium fluorosulfonylimide (LiN(FSO$_2$)$_2$) (LiFSI) and solvent 1,2-dimethoxyethane (DME). For example, the electrolyte mixture may include about 5 wt. % of the gelation reagent. The electrolyte mixture may be added to an electrochemical cell having a positive electrode that comprises sulfur and a negative electrode comprising lithium metal.

Figure 3:
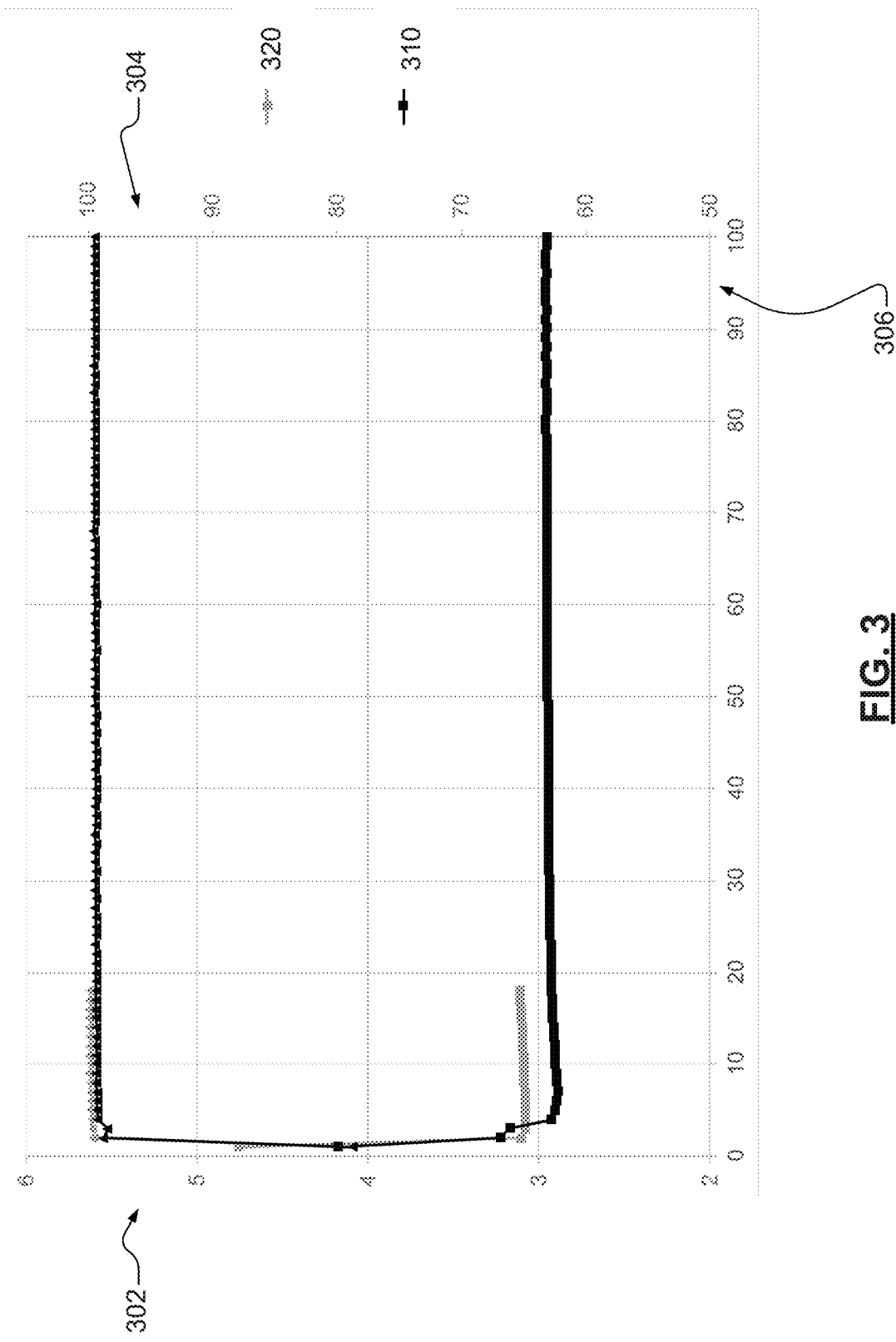
FIG. 3 is a graphical illustration of the capacity retention and columbic efficiency of other comparative electrochemical cells.

The example electrochemical cell is prepared in accordance with various aspects of the present disclosure and may be compared to a comparable baseline electrochemical cell where the gelation reagent is absent. For example, as illustrated in FIG. 3, the example electrochemical cell 310 has improved capacity retention compared to the baseline electrochemical cell 320. In fact, example comparable electrochemical cell 320 suffers an internal short around 20 cycles, while the example electrochemical cell 320 runs for over 100 cycles. The y$_1$-axis 302 in FIG. 3 represents total capacity (mAh) and y$_2$-axis 304 represents columbic efficiency (%), while cycle number is shown on the x-axis 306.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of preparing a gel polymer electrolyte for use in an electrochemical cell that cycles lithium ions, wherein the method comprises:
    adding a gelation reagent to a liquid electrolyte to form an electrolyte mixture that defines the gel polymer electrolyte, wherein the gelation reagent includes one or more initiators and one or more crosslinking agents, the one or more initiators comprising a thermal initiator selected from the group consisting of: azobisisobutyronitrile (AIBN), 1,1'-azobis(cyclohexanecarbonitrile) (ABCN), benzoyl peroxide (BPO), di-tert-butyl peroxide, and combinations thereof, each of the one or more crosslinking agents is one of a tridentate alkane and a tetradentate alkane having one or more substitutes including a terminal group represented by:

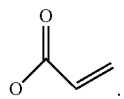

2. The method of claim 1, wherein the one or more crosslinking agents are selected from the group consisting of: trimethylolpropane triacrylate (TMPTA), pentaerythritol triacrylate, ethoxylated trimethylolpropane triacrylate, alkyloyl-modified dipentaerythritol triacrylate, ethoxylated glycerin triacrylate, pentaerythritol tetraacrylate, di(trimethylolpropane) tetraacrylate, ethoxylated pentaerythritol tetraacrylate, and combinations thereof.

3. The method of claim 2, wherein the gel polymer electrolyte includes a polymeric backbone defined by the one or more crosslinking agents.

4. The method of claim 1, wherein after adding the gelation reagent to the liquid electrolyte, the method further comprises heating the electrolyte mixture to a temperature greater than or equal to about 45° C. to less than or equal to about 120° C. for a period greater than or equal to about 5 minutes to less than or equal to about 180 minutes to form the gel polymer electrolyte.

5. The method of claim 1, wherein the one or more initiators further comprises an actinic/electron beam initiator selected from the group consisting of:
    benzophenone, diaryliodonium hexafluoroantimonate, acetophenone, anisoin, benzil, benzoin, 2-benzyl-2-(dimethylamino)-4'-morpholinobutyrophenone, camphorquinone, 4,4'-dihydroxybenzophenone, 4'-ethoxyacetophenone, methybenzoylformate, 2-methyl-4'-(methylthio)-2-morpholinopropiophenone, thioxanthen-9-one, and combinations thereof.

6. The method of claim 1, wherein the gelation reagent comprises greater than or equal to about 0.1 wt. % to less than or equal to about 10 wt. % of the one or more initiators and a balance of the one or more crosslinking agent.

7. The method of claim 1, wherein the gel polymer electrolyte comprises greater than or equal to about 1 wt. % to less than or equal to about 99 wt. % of the gelation reagent.

8. The method of claim 1, wherein the liquid electrolyte comprises:
    one or more lithium salts selected from the group consisting of: lithium hexafluorophosphate (LiPF$_6$); lithium perchlorate (LiClO$_4$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium difluorooxalatoborate (LiBF$_2$(C$_2$O$_4$)) (LiODFB), lithium tetraphenylborate (LiB(C$_6$H$_5$)$_4$), lithium bis-(oxalate)borate (LiB(C$_2$O$_4$)$_2$) (LiBOB), lithium tetrafluorooxalatophosphate (LiPF$_4$(C$_2$O$_4$)) (LiFOP), lithium nitrate (LiNO$_3$), lithium hexafluoroarsenate (LiAsF$_6$), lithium trifluoromethanesulfonate (LiCF$_3$SO$_3$), lithium bis(trifluoromethanesulfonimide) (LiTFSI) (LiN(CF$_3$SO$_2$)$_2$), lithium fluorosulfonylimide (LiN(FSO$_2$)$_2$) (LiFSI), lithium fluoroalkylphosphate (LiFAP) (Li$_3$O$_4$P), and combinations thereof; and
    one or more solvents selected from the group consisting of: ethylene carbonate (EC), propylene carbonate (PC), butylene carbonate (BC), fluoroethylene carbonate (FEC), dimethyl carbonate (DMC), diethyl carbonate (DEC), ethyl methyl carbonate (EMC), methyl formate, methyl acetate, methyl propionate, γ-butyrolactone, γ-valerolactone, 1,2-dimethoxyethane (DME), 1-2-diethoxyethane, ethoxymethoxyethane, tetrahydrofuran, 2-methyltetrahydrofuran, 1,3-dioxolane (DOL), sulfolane, and combinations thereof.

9. The method of claim 1, wherein the method further includes injecting the gel polymer electrolyte into an electrochemical cell.

10. A method of preparing a gel polymer electrolyte for an electrochemical cell that cycles lithium ions, wherein the method comprises:
    contacting a gelation reagent and a liquid electrolyte to form an electrolyte precursor, wherein the gelation reagent includes one or more initiators and one or more crosslinking agents, the one or more initiators comprising a thermal initiator selected from the group consisting of: azobisisobutyronitrile (AIBN), 1,1'-azobis(cyclohexanecarbonitrile) (ABCN), benzoyl peroxide (BPO), di-tert-butyl peroxide, and combinations thereof, and each of the one or more crosslinking agents is one of a tridentate alkane and a tetradentate alkane having one or more substitutes including a terminal group represented by:

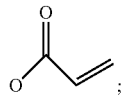

introducing the electrolyte precursor into the electrochemical cell; and curing the electrolyte precursor to form the gel polymer electrolyte.

11. The method of claim 10, wherein the gel polymer electrolyte includes a polymeric backbone defined by the one or more crosslinking agents, wherein the one or more crosslinking agents are selected from the group consisting of: trimethylolpropane triacrylate (TMPTA), pentaerythritol triacrylate, ethoxylated trimethylolpropane triacrylate, alkyloyl-modified dipentaerythritol triacrylate, ethoxylated glycerin triacrylate, pentaerythritol tetraacrylate, di(trimethylolpropane) tetraacrylate, ethoxylated pentaerythritol tetraacrylate, and combinations thereof.

12. The method of claim 10, wherein
the electrolyte precursor is cured by heating the electrolyte precursor to a temperature greater than or equal to about 45° C. to less than or equal to about 120° C. for a period greater than or equal to about 5 minutes to less than or equal to about 180 minutes.

13. The method of claim 10, wherein the one or more initiators further comprises an actinic/electron beam initiator selected from the group consisting of: benzophenone, diaryliodonium hexafluoroantimonate, acetophenone, anisoin, benzil, benzoin, 2-benzyl-2-(dimethylamino)-4'-morpholinobutyrophenone, camphorquinone, 4,4'-dihydroxybenzophenone, 4'-ethoxyacetophenone, methybenzoylformate, 2-methyl-4'-(methylthio)-2-morpholinopropiophenone, thioxanthen-9-one, and combinations thereof.

14. The method of claim 10, wherein the gelation reagent comprises greater than or equal to about 0.1 wt. % to less than or equal to about 10 wt. % of the one or more initiators and a balance of the one or more crosslinking agent.

15. A method of preparing a gel polymer electrolyte for use in an electrochemical cell that cycles lithium ions, wherein the method comprises:
adding a gelation reagent to a liquid electrolyte to form an electrolyte mixture that defines the gel polymer electrolyte, the gelation reagent comprising one or more initiators and one or more crosslinking agents, each of the one or more initiators being one of a thermal initiator and an actinic/electron beam initiator, each of the one or more crosslinking agents being one of a tridentate alkane and a tetradentate alkane having one or more substitutes including a terminal group represented by:

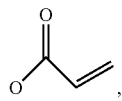

and the liquid electrolyte comprising one or more lithium salts selected from the group consisting of: lithium hexafluorophosphate (LiPF$_6$); lithium perchlorate (LiClO$_4$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium difluorooxalatoborate (LiBF$_2$(C$_2$O$_4$)) (LiODFB), lithium tetraphenylborate (LiB(C$_6$H$_5$)$_4$), lithium bis-(oxalate)borate (LiB(C$_2$O$_4$)$_2$) (LiBOB), lithium tetrafluorooxalatophosphate (LiPF$_4$(C$_2$O$_4$)) (LiFOP), lithium nitrate (LiNO$_3$), lithium hexafluoroarsenate (LiAsF$_6$), lithium trifluoromethanesulfonate (LiCF$_3$SO$_3$), lithium bis(trifluoromethanesulfonimide) (LiTFSI) (LiN(CF$_3$SO$_2$)$_2$), lithium fluorosulfonylimide (LiN(FSO$_2$)$_2$) (LiFSI), lithium fluoroalkylphosphate (LiFAP) (Li$_3$O$_4$P), and combinations thereof, and one or more solvents selected from the group consisting of: ethylene carbonate (EC), propylene carbonate (PC), butylene carbonate (BC), fluoroethylene carbonate (FEC), dimethyl carbonate (DMC), diethyl carbonate (DEC), ethyl methyl carbonate (EMC), methyl formate, methyl acetate, methyl propionate, γ-butyrolactone, γ-valerolactone, 1,2-dimethoxyethane (DME), 1-2-diethoxyethane, ethoxymethoxyethane, tetrahydrofuran, 2-methyltetrahydrofuran, 1,3-dioxolane (DOL), sulfolane, and combinations thereof.

16. The method of claim 1, wherein the one or more crosslinking agents are selected from the group consisting of: trimethylolpropane triacrylate (TMPTA), pentaerythritol triacrylate, ethoxylated trimethylolpropane triacrylate, alkyloyl-modified dipentaerythritol triacrylate, ethoxylated glycerin triacrylate, pentaerythritol tetraacrylate, di(trimethylolpropane) tetraacrylate, ethoxylated pentaerythritol tetraacrylate, and combinations thereof.

17. The method of claim 15, wherein the one or more initiators comprise an actinic/electron beam initiator selected from the group consisting of: benzophenone, diaryliodonium hexafluoroantimonate, acetophenone, anisoin, benzil, benzoin, 2-benzyl-2-(dimethylamino)-4'-morpholinobutyrophenone, camphorquinone, 4,4'-dihydroxybenzophenone, 4'-ethoxyacetophenone, methybenzoylformate, 2-methyl-4'-(methylthio)-2-morpholinopropiophenone, thioxanthen-9-one, and combinations thereof, and
wherein after adding the gelation reagent to the liquid electrolyte, the method further comprises applying one of an electron beam or an actinic radiation to the electrolyte mixture to form the gel polymer electrolyte.

18. The method of claim 10, wherein the one or more initiators comprise a thermal initiator selected from the group consisting of: azobisisobutyronitrile (AIBN), 1,1'-azobis(cyclohexanecarbonitrile) (ABCN), benzoyl peroxide (BPO), di-tert-butyl peroxide, and combinations thereof; and
the electrolyte precursor is cured by heating the electrolyte precursor to a temperature greater than or equal to about 45° C. to less than or equal to about 120° C. for a period greater than or equal to about 5 minutes to less than or equal to about 180 minutes.

19. The method of claim 15, wherein the gelation reagent comprises greater than or equal to about 0.1 wt. % to less than or equal to about 10 wt. % of the one or more initiators and a balance of the one or more crosslinking agent.

20. The method of claim 15, wherein the gel polymer electrolyte comprises greater than or equal to about 1 wt. % to less than or equal to about 99 wt. % of the gelation reagent.

* * * * *